UNITED STATES PATENT OFFICE.

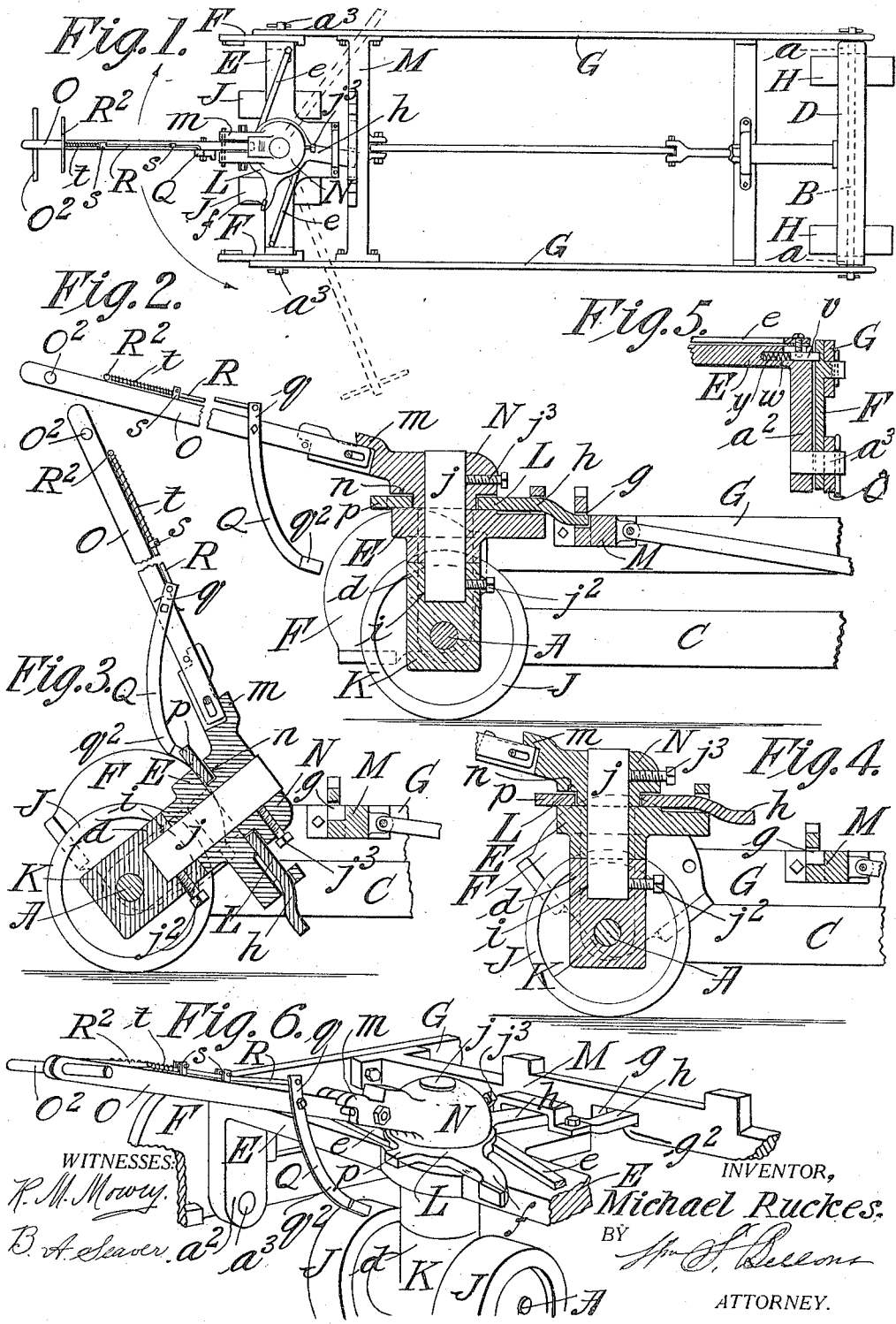

MICHAEL RUCKES, OF CHICOPEE, MASSACHUSETTS, ASSIGNOR, BY MESNE ASSIGNMENTS, TO EUGENE M. CHAPMAN AND CHARLES E. COWAN, BOTH OF HOLYOKE, MASSACHUSETTS.

ELEVATING-TRUCK.

1,196,723.   Specification of Letters Patent.   Patented Aug. 29, 1916.

Application filed December 14, 1914. Serial No. 877,062.

*To all whom it may concern:*

Be it known that I, MICHAEL RUCKES, a citizen of the United States of America, and resident of Chicopee, in the county of Hampden and State of Massachusetts, have invented certain new and useful Improvements in Elevating-Trucks, of which the following is a full, clear, and exact description.

This invention relates to improvements in what is termed an elevating truck,—that is one in which there is, supplemental to the main truck frame which is mounted on front and rear sets of rollers,—a frame, in substance link connected to the main truck frame and adapted by means operable to swing the links, to be raised suitably high above the main frame or to be permitted to be lowered down onto the main frame.

A truck of the particular character to which this invention pertains has heretofore comprised, and now comprises, lower opposite side bars, transverse front and rear bars or bolsters, connected to the side bars and respectively having sets of rollers, and an upper supplemental truck frame, in substance link connected at the rear to the lower frame, and connected through means of link plates, separate from the front bolster bar to the front of the truck frame, there being detachable locking means between the front bolster bar and the link plates, which when "in lock" cause, from the swinging of the front bolster rearwardly and downwardly, or forwardly and upwardly, the lowering of the already elevated supplemental frame, or the elevation of the lowered supplemental frame; and in such truck the oscillation of the forward bolster bar is accomplished through means of the forwardly and upwardly extended draft handle, the pivotal center of the oscillation being the short axle of the forward rollers, which axle is carried by, or as a part of a depending head centrally located, and adapted to swivel, relatively to the front bolster bar.

The truck of the character above described as heretofore constructed has had the connection of the draft handle with the swiveling depending member of the forward bolster bar at a comparatively low point, that is at about the height of the front roller axle; and for this reason the handle could only be swung to control the forward rollers for steering or turning the truck around in a limited extent, because an extreme swinging of the draft handle would be obstructed by parts of the truck located outwardly beyond and at opposite sides of the depending swiveling head.

One object of the present invention is to so construct the truck at its forward portion that the draft handle has its connection above, instead of below, the front bolster bar and so that such handle may be swung sharply to either side, even to or beyond a right angle to the length of the truck whereby the truck may be turned around within its own length because of the correspondingly sharp deflection of the closely arranged forward supporting and steering rollers.

Another object of the invention is to combine with the draft handle and the device which is operative to lock and unlock the front bolster bar and the link plates, manually operable means whereby a person while grasping the draft handle may, with the fingers, simultaneously operate the locking device, thereby conducing to convenience in the employment of the truck.

The invention is described in conjunction with the accompanying drawings and is set forth in the claims.

In the drawings:—Figure 1 is a plan view of an elevating truck of the general character indicated and showing the construction and arrangement thereon of the parts constituting the present novel subject matter. Fig. 2 is a sectional elevation centrally and vertically through the forward portion of the truck in which the present novel arrangements are comprised, the supplemental frame being shown as elevated. Fig. 3 is a sectional elevation showing the parts in their positions while the supplemental frame is being lowered. Fig. 4 is a similar sectional elevation but showing the supplemental frame lowered and the oscillating bolster bar and appurtenances thereof restored to their normal position. Fig. 5 is a fragmentary transverse vertical section to show the character of the device for locking the oscillatory bolster bar to the link plates. Fig. 6 is a perspective view showing the forward portion of the truck in which all of the novelties of the present invention are comprised.

Similar characters of reference indicate corresponding parts in all of the views.

The truck in part comprises front and rear axles A and B and opposite side bars C C.

At the rear of the truck, over the rear axle, is a bolster bar D, having depending members $a\ a$ through the lower portions of which the rear axle is extended, such rear axle also extending through the opposite lower side bars.

At the front of the truck is another transverse bolster bar E having at its opposite ends depending members $a^2$ through which pivot studs $a^3$ are extended, which also extend through the forward extremities of the lower side bars C C and through link plates F which are disposed between the depending members $a^2$ of the front bolster and the side bars.

G G represent the upper side bars, the forward ends of which are pivotally connected to the link plates F, while the rear ends thereof are pivotally connected to the ends of the rear bolster bar D near the top thereof.

H H represent the rear rollers of the truck mounted on the rear axle, and J J represent the more closely arranged forward rollers mounted on the forward axle A at opposite sides of the "head" K, through which the axle A is transversely passed, and which head includes an upstanding centrally disposed hub $d$.

Above and centrally of the forward bolster bar E is a plate L pivotally connected on the bar for a partially revoluble motion in a horizontal plane, the same having connected thereto at points eccentrically of its pivotal center, links $e\ e$ which connect, at their outer ends, with slide bolts $v$ fitted in the ends of the bolster bar E and adapted, under the stress of the springs $y$ therefor, to engage each in sockets $w$ within the inner side of the adjacent link plate F.

The plate has a projection $f$ by means of which it may be moved by a foot thrust to effect a withdrawal of the bolts to unlock the front bolster bar from the link plates when the same may be locked therewith.

The upper opposite pair of side bars G G are connected by a cross girder M constructed with a downwardly opening recess $g$, which recess has its mouth or opening narrowed at one side by the lug $g^2$ which forms a locking shoulder for the rearwardly projecting arm $h$ of the partially revoluble plate L, this arm being effective when the supplemental truck frame is elevated, to lock the same against being lowered under the weight of the load excepting as the lowering is purposed and the said arm is disengaged from within the recess in the said girder M by the proper swinging of the plate so as to permit, by the bolster, its rearward rocking and a corresponding rearward rocking of the link plates F, to which the forward ends of the upper side bars are pivoted, and which side bars being similarly pivoted to the upper side of the rearward bolster bar cause the latter to be rearwardly rocked,—the side bars being always maintained parallel with the lower side bars while moving down onto them, or while being moved upwardly away from them,—the principle here involved being that of a duplicated parallel rule.

The truck as so far described embodies constructions and combinations or arrangements of parts devised by others and already in somewhat extensive use.

I will now proceed to describe the features and arrangements composing the subject matter of the improvements claimed by me.

The upstanding hub $d$ of the head K, through which the axle A of the forward rollers J J is journaled is formed with a socket $i$ in which a post $j$ is fitted and permanently secured by the set screw $j^2$. This post extends upwardly through and above the top of the bolster bar E.

Above the bolster bar is a separately made and independently movable head N permanently secured to the upwardly projecting portion of the post $j$ by the set screw $j^3$; and this head N is provided with a forwardly extending lug $m$ with which the draft handle O is rigidly connected in any suitable manner,—it being noted that the handle connection with the said head is entirely above the bolster E and the supplemental elevating frame and all appurtenances thereof. The said upper head N, to which the draft handle O is connected, has its lower portion of reduced diameter so that a shoulder $n$ is formed; and the centrally apertured plate L turns on the reduced lower portion of the head and is retained against displacement vertically by the shoulder $n$ as clearly represented in Figs. 2, 3 and 4. The aforementioned plate L which operates the locking device has at its forward and middle portion a lug $p$.

A lever Q is pivoted a short distance from its upper end on the side of the draft handle, well down toward the connection of the latter with the head N. To the short upper arm $q$ of this lever an operating rod R is connected, said rod being guided by lugs $s$ formed on or affixed to the upper edge of the draft handle o, and this operating rod has at its forward end a cross member $R^2$ which is located in proximity to the cross member $O^2$ of the draft handle.

The spiral spring $t$ applied between the cross member $R^2$ and one of the lugs $s$ is effective for maintaining the lever $q$ swung to the position shown in Figs. 2 and 6 of the drawing, that is the curved arm $q^2$ of the lever has a position of withdrawal from proximity to the lug $p$ of the plate L.

Now assuming that the supplemental truck frame including the opposite side bars G G is elevated as shown in Fig. 2, the forward bolster bar E being locked by the bolts to the link plates F F, and the arm $h$ is interlocked in the recess $g$ with the lug $g^2$ of the girder M connecting the upper side bars.

With the draft handle in the longitudinal central line of the truck, a person having the palms of the hands on the cross member $O^2$ will, with the fingers reaching over the cross member $R^2$ of the operating rod R, draw the latter forwardly against the reaction of the spring $t$ to swing the lever Q so that its lower bent arm will be brought into engagement with the lug $p$, whereupon by then swinging the draft handle, which carries the said lever to the rightward, the plate L will be revolubly forced so that the arm $h$ will be disengaged from its locking connection in the recess $g$, whereby then on rearwardly rocking the forward bolster bar E on the forward axle as its center as shown in Fig. 3, the frame may be caused to descend to its lowered position.

The lowering of the truck frame would be followed on the righting of the forward bolster bar to the position represented in Fig. 4 by again elevating the supplemental truck frame were the locking engagement between the forward bolster bar and the link plates, maintained after the lowering. So, through the instrumentality of the operating rod and lever and the swinging to the rightward of the draft handle and head, the bolts may be withdrawn and then on the upward and forward swinging of the " head works " of the truck the bolster and its post $j$ may be carried to the righted position so that the truck with its supplemental frame lowered may then be wheeled and steered and turned around all as may be desired. But, of course, without unlocking the parts the head works may be righted to the position shown in Fig. 4, carrying the supplemental frame again to its elevated position, it having been assumed, for instance, that the load has been removed from the skid and it may be desired to take the latter aboard the truck and convey it to another place.

The construction and combination of parts are, as will be especially perceived in the sectional views, susceptible of inexpensive production and the assemblage may be accomplished with rapidity and convenience.

Having made it clear that the novelties constituting the present improvements are found in the specific construction whereby the connection of the draft handle with the post, which is to all intents and purposes an upstanding part of the lower head K, is well above all of the parts of the truck so that the draft handle may be swung, for instance, as far around to either side as indicated by the dotted lines in Fig. 1,—and which is not possible in the truck as heretofore constructed,—and are found in the means appurtenant to the draft handle for operating the locking device without disengagement of the grasp of the person using the truck on the draft handle, I, therefore, declare that what I claim is:

1. In an elevating truck of the character described, lower side bars, link plates pivotally connected to the lower side bars, upper side bars, the forward extremities of which are connected to the link plates, a forward bolster bar having at each end a depending member pivotally connected to the adjacent link plate, an axle head provided with a fixed post extending loosely through and above the middle of the bolster bar, and having connected with the upper portion thereof, above said bolster bar, a forwardly extending draft handle, and means for detachably locking the bolster bar and link plates.

2. In an elevating truck of the character described, lower side bars, link plates pivotally connected to the lower side bars, and upper side bars, the forward extremities of which are connected to the link plates, a forward bolster bar having at each end a depending member pivotally connected to the adjacent link plate, an axle head having an upwardly open socket, a post fixed in said socket and extending loosely through and above the middle of the bolster bar, a head affixed on the upper portion of said post above the bolster bar, and having connected therewith a forwardly extending draft handle, and means for detachably locking the bolster bar and link plates.

3. In an elevating truck of the character described, in combination, lower side bars, link plates pivotally connected to the lower side bars, upper side bars, the forward extremities of which are connected to the link plates, a forward bolster bar having at each end a depending member pivotally connected to the adjacent link plate, means for detachably locking said depending members and link plates, an axle head having a swiveling connection with the bolster bar, and a draft handle having connections with the axle head, a plate mounted for pivotal movement on the bolster bar adapted to operate said locking means, and a device, comprising a member movably mounted on the draft handle adjacent, and adapted to temporarily engage, said plate, and also comprising a member extended to the forward end of the draft handle and operable to control said movable member for its coaction with said plate.

4. In an elevating truck of the character described, in combination, lower side bars, link plates pivotally connected to the lower side bars, upper side bars, the forward extremities of which are connected to the link plates, a member transversely connecting the upper side bars, somewhat to the rear of their forward ends, a forward bolster bar having at each end a depending member pivotally connected to the adjacent link plate, means for detachably locking said depending members and link plates, an axle head having a post extending upwardly through, and swiveling relatively to the bolster bar, a head secured on the upper end of the post, and having its lower portion reduced and shouldered, a draft handle connected to said last named head above the bolster bar, a centrally apertured plate on the bolster bar, embracing the said reduced portion of the handle-provided head and overhung by said shouldered portion of the latter, said plate being adapted to operate said locking means and having an arm adapted for an interlocking engagement with the member which transversely connects the upper side bars, a lever pivotally hung on the draft handle and adapted to be swung to engagement with said plate, and means connected with said lever and extending to, and operable at, the forward end of the draft handle for swinging said lever for its coaction with said plate.

5. In an elevating truck of the character described, in combination, lower side bars, link plates pivotally connected to the lower side bars, upper side bars, the forward extremities of which are connected to the link plates, a forward bolster bar having at each end a depending member pivotally connected to the adjacent link plate, means for detachably locking said depending members and link plates, an axle head having a swiveling connection with the bolster bar, and a draft handle having connection with the axle head, and provided at its forward end with a cross handle, a plate mounted for pivotal movement on the bolster bar adapted to operate said locking means, a lever pivotally hung on the draft handle and adapted to be swung to engagement with said plate, a rod slidably carried by the draft handle having its rear end connected to said lever and having its forward end provided with a cross member adjacent the cross member of the draft handle and a spring for rearwardly retracting said rod.

Signed by me in presence of two subscribing witnesses.

MICHAEL RUCKES.

Witnesses:
J. M. SULLIVAN,
R. G. WHIPPLE.

Copies of this patent may be obtained for five cents each, by addressing the "Commissioner of Patents, Washington, D. C."